United States Patent [19]
Haruki

[11] Patent Number: 6,157,742
[45] Date of Patent: Dec. 5, 2000

[54] METHOD FOR EXPANDING DATA

[75] Inventor: Toshinobu Haruki, Kyotanabe, Japan

[73] Assignee: Sanyo Electric Co., Ltd., Osaka, Japan

[21] Appl. No.: 09/096,493

[22] Filed: Jun. 12, 1998

[30]       Foreign Application Priority Data

Jun. 13, 1997   [JP]   Japan ................................ 9-157160

[51] Int. Cl.$^7$ .............................. G06K 9/36; G06K 9/46
[52] U.S. Cl. ........................................ 382/233; 382/250
[58] Field of Search .................................. 382/233, 246, 382/250

[56]             References Cited

U.S. PATENT DOCUMENTS

| | | | |
|---|---|---|---|
| 4,951,157 | 8/1990 | Koh et al. | 358/433 |
| 5,099,325 | 3/1992 | Artieri et al. | 348/420 |
| 5,327,248 | 7/1994 | Miller et al. | 358/261.4 |
| 5,694,489 | 12/1997 | Kishi | 382/233 |

FOREIGN PATENT DOCUMENTS

| | | |
|---|---|---|
| 0 480 353 A2 | 4/1992 | European Pat. Off. . |
| 0 586 225 A2 | 3/1994 | European Pat. Off. . |

OTHER PUBLICATIONS

W.B. Pennebaker and J.L. Mithcell: "JPEG Still Image Data Compression Standard"1992, Van Nostrand Reinhold, US, New York XP002126854.

*Primary Examiner*—Phuoc Tran
*Attorney, Agent, or Firm*—Armstrong, Westerman, Hattori, McLeland & Naughton

[57]              ABSTRACT

In a data expanding method, compressed data including a plurality of blocks is first subjected to entropy decoding, block by block, in a horizontal direction. At a last block on each line, the decoded data is subjected to inversive quantization. By decoding the last block on a line, an address is detected that is recorded with head data of a head block on a next line. By the inversive quantization of the last block of the line, a DC value is detected that is required for inversively quantize the head block of the next line. The block beginning from the detected address is subjected to entropy decoding and inversive quantization so that the inversively quantized data is subjected to IDCT conversion using the detected DC value. Also, during expansion, an adjacent block address and a DC value of the current block are detected.

6 Claims, 7 Drawing Sheets

F I G. 3
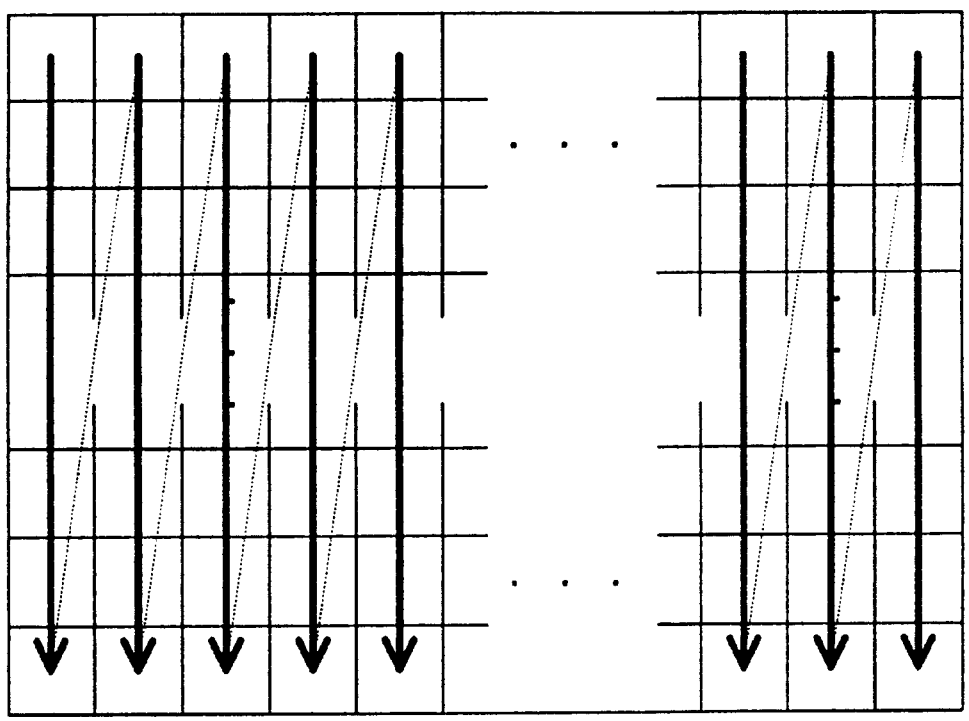

FIG. 4

| i | ADDRESS | DC VALUE |
|---|---------|----------|
| 1 | | |
| 2 | | |
| 3 | | |
| ⋮ | ⋮ | ⋮ |
| 58 | | |
| 59 | | |
| 60 | | |

METHOD FOR EXPANDING DATA

BACKGROUND OF THE INVENTION

1. Field of the Invention

This invention relates to a method for expanding data, and more particularly to a data expanding method applicable to a digital camera wherein an expansion process is vertically performed on a plurality of blocks included in compressed image data.

2. Description of the Prior Art

There is a disclosure as one example of a digital camera employing a data expanding method of this kind in Japanese Patent Application No. H8-226758 [H04N 9/00] filed on Aug. 28, 1996. In this prior art, the compressed image data, recorded by compression according to a JPEG format, is expanded by using a memory having a 1-screen capacity so that the expanded image data is outputted through scanning in a vertical direction. Accordingly, where the expanded image is printed out by a page printer having a vertically-arranged printhead, the page printer does not require a memory for storing the expanded image data.

However, this technology requires the provision of a memory having a 1-screen capacity within the digital camera. That is, the compressed image data is configured by a plurality of blocks. The expansion of a certain block essentially requires another horizontally-preceding block. Consequently, when the expanded image data is to be vertically scanned over, expansion must be completed over one screen, thus requiring a memory with a capacity of as large as 1 screen.

SUMMARY OF THE INVENTION

Therefore, it is a primary object of this invention to provide a data expanding method that is capable, while even low in memory capacity, of creating expanded image data having been subjected to an expanding process in a vertical direction.

This invention is a data expanding method for performing an expanding process on compressed image data having a plurality of blocks configured in horizontal and vertical directions, comprising the steps of: (a) performing a predetermined process on a horizontal block row to detect a first parameter required for an expanding process for a block included in a first vertical block row; and (b) performing an expanding process on the block included in the first vertical block row with using the first parameter, and detecting a second parameter required for an expanding process for a block included in a second vertical block row.

The horizontal block rows are each subjected to the predetermined process, and a first parameter is detected that is required to expand for the first vertical block row. Using the first parameter, the vertical block row is subjected to an expanding process. At the same time, a second parameter is detected that is required to expand for the second vertical block row.

In one aspect of this invention, the first parameter is determined as follows. The horizontal block row is subjected to decoding, block by block. Based on decoding data of a predetermined block included in the horizontal block row, detection is made for a head address of a block included in the first vertical block row. The decoding data of the predetermined block is subjected to inversive quantization, and a DC value is detected from the inversively quantized data of the predetermined block. The head address and the DC value thus detected are the first parameter. Incidentally, during the first expanding, the predetermined block is a last block in the horizontal block row, and the first vertical block includes a head block in the horizontal block row.

The 1-block data, beginning from the detected head address, is subjected to decoding, thereby creating decoding data of the block included in the first vertical block row. The created decoding data is subjected to inversive quantization. The inversively quantized data thus created is subjected to IDCT conversion using a corresponding DC value. In this manner, the expansion process is completed for the first vertical block row.

During expanding for the first vertical block row, the second parameter is determined as follows. Based on the decoding data in the first vertical block row, detection is made for a head address of a block included in a second vertical block row. A DC value is detected from the inversively quantized data of the first vertical block row. The detected head address and DC value are the second parameter.

In another aspect of this invention, after detecting the second parameter, the first parameter is updated by the second parameter, and the first vertical block row is updated by the second vertical block row. That is, in a next expanding process, the current second parameter becomes a first parameter, and the current second vertical block row becomes a first vertical block row. Thus, the expansion process is effected for a next second vertical block row.

According to this invention, the horizontal block row is subjected to a predetermined process to detect a first parameter required for expanding a first vertical block row, and a second parameter for a second vertical block row is detected during an expanding process of the first vertical block row. It is therefore possible to perform an expanding process in the vertical direction with low memory capacity.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 3 is an illustrative view showing another part of the operation in the FIG. 1 embodiment;

FIG. 4 is an illustrative view showing a table;

DETAILED DESCRIPTION OF THE PREFERRED EMBODIMENTS

Figure 1:
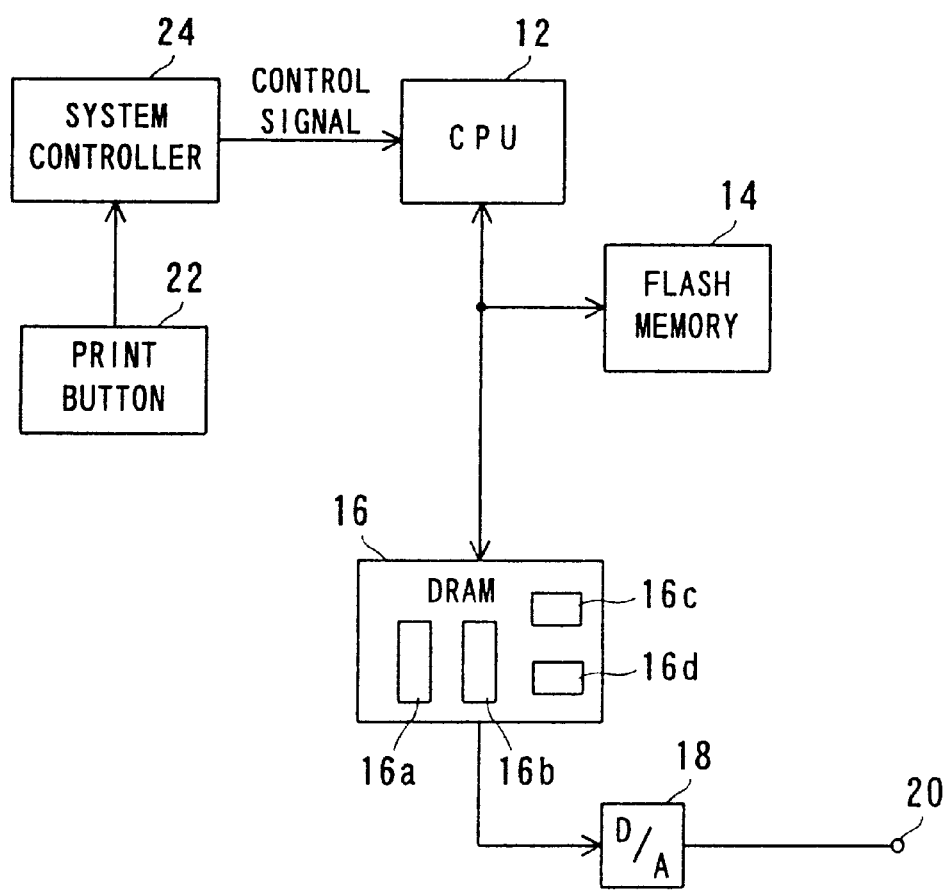
FIG. 1 is a block diagram showing one embodiment of this invention.
Figure 2:
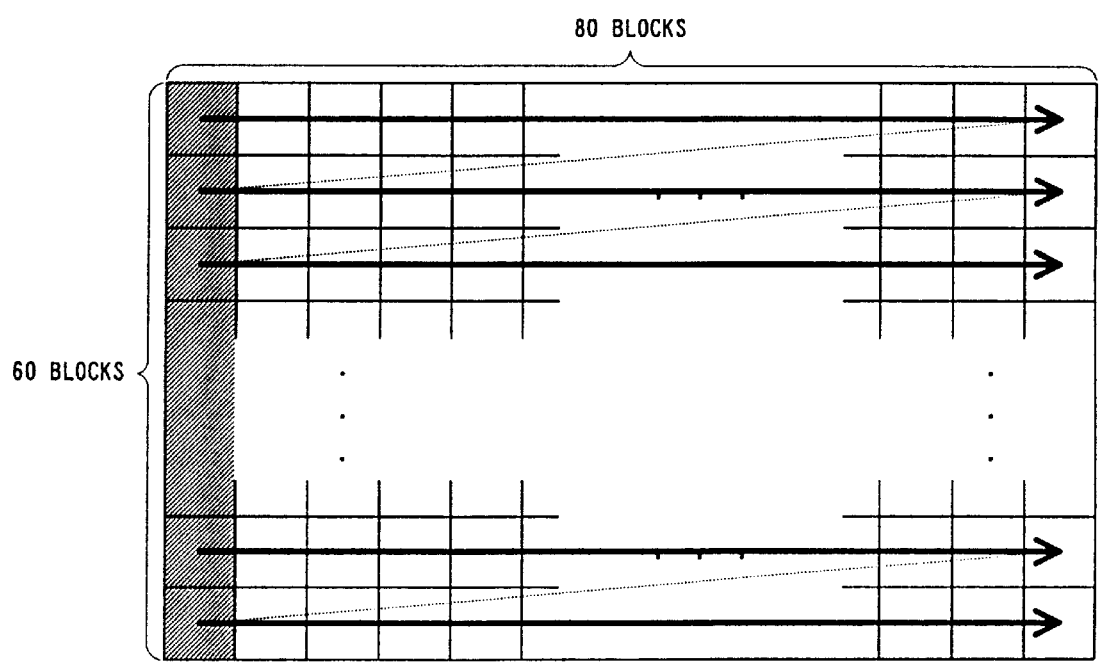
FIG. 2 is an illustrative view showing part of operation in the FIG. 1 embodiment.

Referring to FIG. 1, a digital camera 10 in this embodiment includes a flash memory 14. This flash memory 14 is recorded with image data compressed by a JPEG format, as shown in FIG. 2. That is, the image data, when compressed according to the JPEG format, is subjected to DCI conversion, quantization and entropy encoding on a unit of 8×8 pixels. This creates compressed image data including blocks of 80 and 60 respectively in horizontal and vertical directions, as shown in FIG. 2.

If a print button 22 is depressed by an operator, the system controller 24 supplies a control signal to a CPU 12. In response thereto, the CPU 12 reads compressed image data out of the flash memory 14, and expands the compressed data, block by block, with using a working area 16a formed in a DRAM 16. Specifically, the CPU 12 performs entropy decoding, inversive quantization and IDCT conversion on each block contained in the compressed image data, thereby creating expanded image data. The image data thus created is then converted by a D/A converter 18 into an analog signal (image signal) so that the image signal is outputted to a not-shown page printer through an output terminal 20.

The working area 16a has a memory capacity equivalent to one vertical block row of the compressed image data, i.e. 60 blocks. Using this working area 16a, the CPU 12 first performs a predetermined process in a horizontal direction as shown in FIG. 2 to thereby determine a parameter required to expand for a vertical block row as shown by hatching. After obtaining the parameter, the CPU 12 then performs an expanding process on the hatched vertical block row, and at the same time determines a parameter required to expand for an adjacent vertical block row. That is, the CPU 12 carries out vertical expansion as shown in FIG. 3, and outputs the expanded image data each time the expansion process is completed on one vertical block row. If the expanded image data of the vertical block row as hatched in FIG. 2 is outputted, the CPU 12 performs expansion on the adjacent vertical block row using the newly-determined parameter.

As a consequence, even where the working area 16a is small in capacity, it is possible to perform vertical scan and expansion on compressed image data, thus being compatible with a page printer having a printhead vertically arranged. That is, where such a page printer is connected to the output terminal 20, the page printer can print out desired images even if it does not have an image memory of a capacity of as large as one page.

Figure 4:
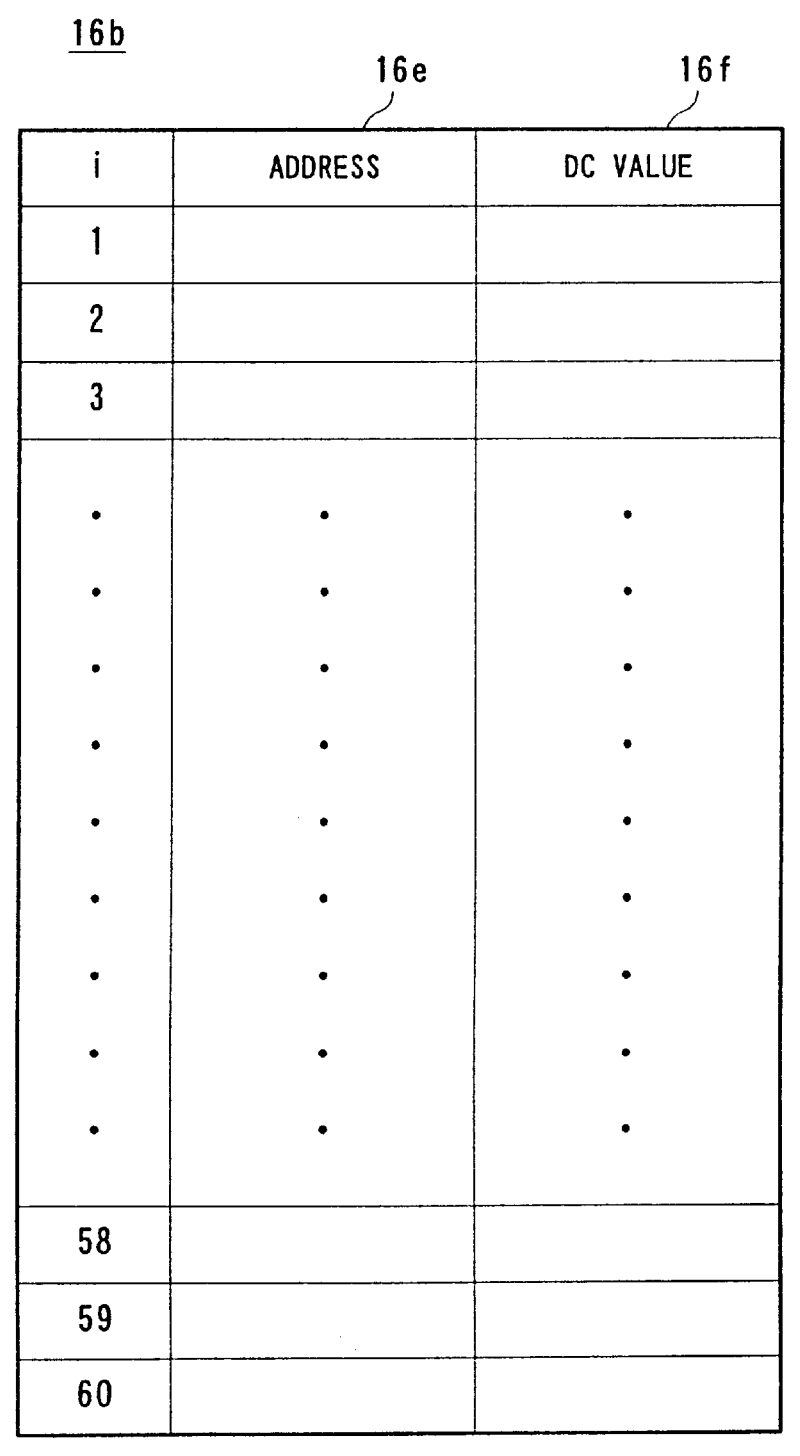
Figure 5:
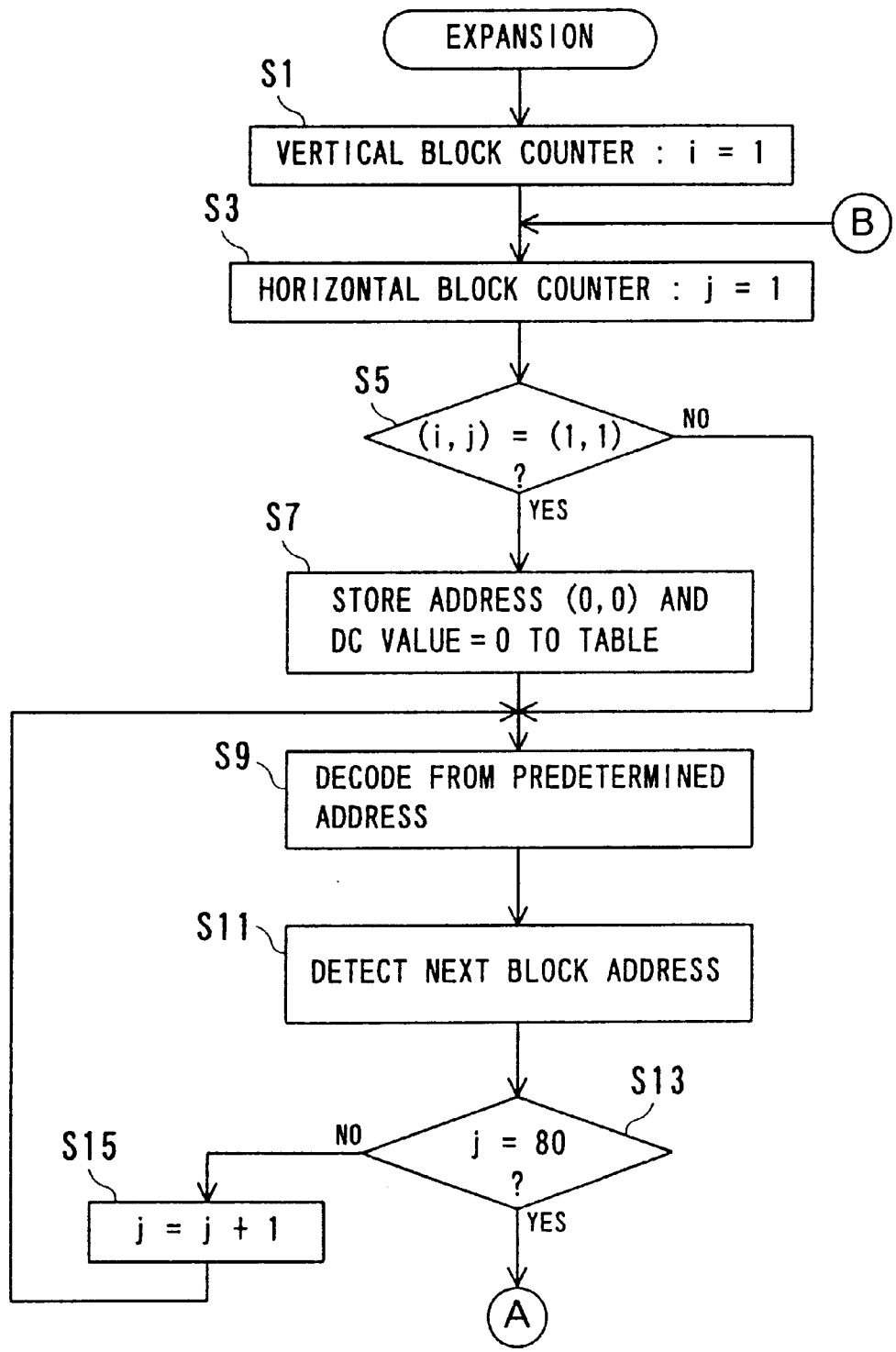
FIG. 5 is a flowchart showing part of operation in the FIG. 1 embodiment.
Figure 6:
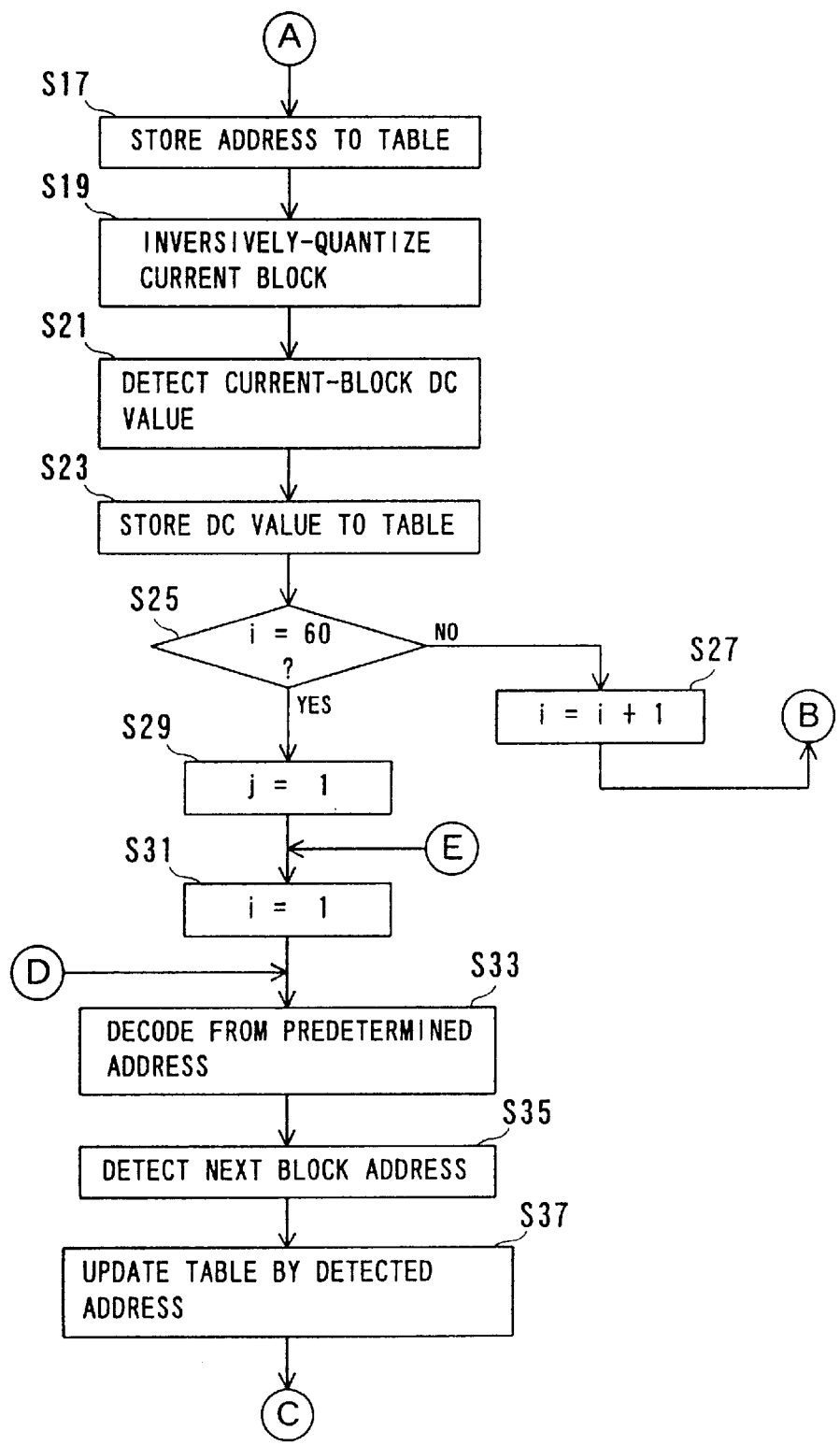
FIG. 6 is a flowchart showing another part of the operation in the FIG. 1 embodiment.
Figure 7:
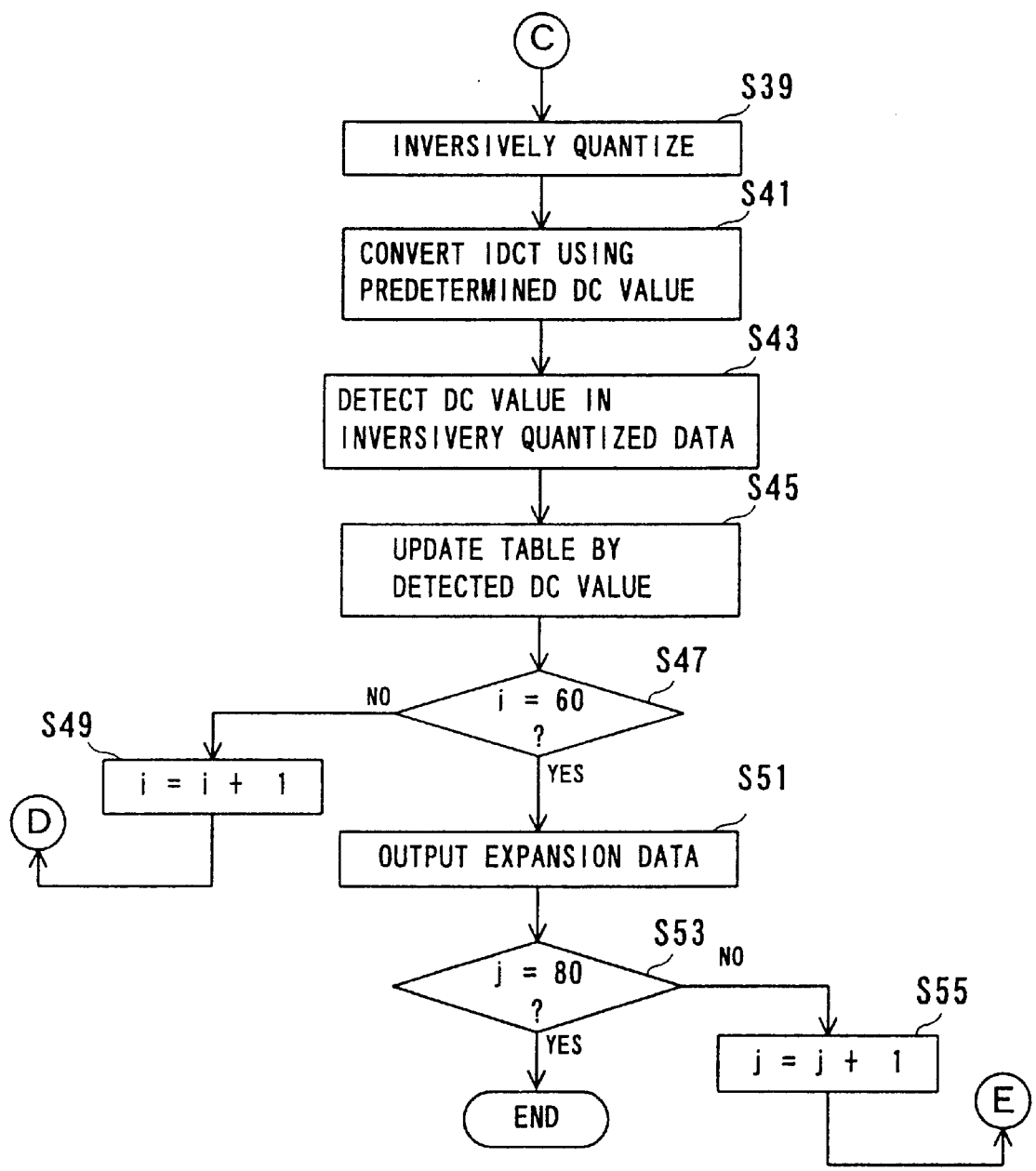
FIG. 7 is a flowchart showing another part of the operation in the FIG. 1 embodiment.

Specifically, the CPU 12 processes according to flowcharts shown in FIG. 5 and FIG. 6. That is, at steps S1 and S3, setting is made to "1" for a count value i of the vertical block counter 16c as well as a count value j of a horizontal block counter 16d. It is then determined at a step S5 whether (i, j)=(1, 1) or not. If the determination here is "NO", the process directly proceeds to a step S9, while if "YES", the CPU 12 stores, at a step S7, an address (0, 0) and a DC value=0 into a table 16b formed in the DRAM 16. More particularly, the table 16b includes an address holding area 16e and a DC-value holding area 16f as shown in FIG. 4. Since the step S7 is executed at a count value i=1, the address (0, 0) and the DC value=0 are respectively stored into the address holding area 16e and the DC-value holding area 16f, correspondingly to i=1.

The CPU 12 subsequently starts, at a step S9, entropy decoding from the address (0, 0), and ends the process of the step S9 at a time that 1 block of the recorded data is obtained. At a step S11 is detected an address of a horizontally-next block, i.e. a head data of a block (i, j+1) recorded in the flash memory 14. That is, the address recorded with head data of the next block can be first detected by subjecting the current block to entropy decoding. For this reason, the CPU 12 performs a process of the step S9. The CPU 12 thereafter determines at a step S13 whether the count value j is "80" or not. If "NO", the count value j is incremented at a step S15, and the process returns to the step S9. At the step S9 in a second cycle and the subsequent, the CPU starts entropy decoding from the address detected at the step S11.

When 80 blocks or 1 line are completed of entropy decoding in this manner, the CPU determines "YES" at a step S13, and writes the address detected by the immediately-preceding step S11 into the address holding area 16e at a step S17. That is, since the address detected by the step S11 is an address recorded with head data of a head block in the next line, the CPU writes the address into the address holding area 16e by making it correspond to the number of the next line. For example, if the current count value i of the vertical block counter 16c is "1", the detected address is written by making correspond to i=2. The CPU 12 thereafter performs, at a step S19, inversive quantization on the decoding data of the current block, i.e. block (i, 80), and detects a DC value included in the inversively quantized data at a step S21. Then, the CPU 12 writes, at a step S23, a detected DC value into a DC-value holding area corresponding to the number of the next line. For example, if the current line number or count value i is "1", the DC value is written to a site corresponding to i=2.

The CPU 12 thereafter determines at a step S25 whether the count value i is "60" or not, that is, whether the current line is a last line or not. If "NO", the count value i is incremented at a step S27, and the process returns to the step S3, while if "YES", the process advances to a step S29. By effecting these processes, the blocks are subjected to entropy decoding in the order as shown by arrows in FIG. 2. At the last block of each line, inversive quantization is made subsequent to entropy decoding. Due to this, detection is made for an address recorded with the head data of the head block on each line, i.e. an address recorded with the head data of each block contained in the vertical block row shown by hatching in FIG. 2. Detection is also made for a DC value required to inversively quantize each block.

The CPU 12 sets the count values j and i to 1 at respective steps S29 and S31, and detects an address corresponding to the count value i of the address holding area 16e at a step S33 to start entropy decoding from the address. Step S35 detects an address of the flash memory 14 recorded with head data of the next block, i.e. the block (i, j+1). Step S37 updates an address corresponding to the count value i of the address holding area 16e by the detected address. The CPU 12 thereafter performs at a step S39 inversive quantization on the decoding data obtained by the step S33, and carries out IDCT conversion on the inversively quantized data with using the DC value of the DC value holding area 16f corresponding to the count value i. Then, Step S43 detects a DC value included in the inversively quantized data obtained by the step S39. Step S45 updates a DC value corresponding to the count value i stored in the DC-value holding area 16f by the detected DC value.

The CPU 12 determines at a step S47 whether the count value i is "60" or not. If "NO", the count value i is incremented at a step S49, and the process returns to the step S33. However, if "YES", it is considered that all the blocks included in the current vertical block row are completed of the expansion process, and one-row expanded data is outputted at a step S51. It is determined at a step S53 whether the count value j is "80" or not. If "NO", the count value j is incremented at a step S55, and the process returns to the step S31. If "YES", the process is ended.

By thus processing the steps S29 and the subsequent, expansion is made in the vertical direction as shown in FIG. 3, and the expanded data is outputted on a row basis.

According to this embodiment, entropy decoding is first made in the horizontal direction and inversive quantization is made for a desired block to detect a parameter required to expand each block contained in a predetermined vertical clock row, and then the parameter is updated each time expansion is made in the vertical direction. Thus vertical data expansion is possible with less memory capacity.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method for expanding compressed image data having a plurality of blocks configured in horizontal and vertical directions, comprising the steps of:

(a) performing a predetermined process on a horizontal block row to detect a first parameter required for an expanding process for a block included in a first vertical block row; and (b) performing an expanding process on the block included in the first vertical block row with using the first parameter, and detecting a second parameter required for an expanding process for a block included in a second vertical block row.

2. A method for expanding data according to claim 1, wherein the predetermined process includes decoding and inversive quantization, wherein the step (a) includes steps of (a-1) performing decoding, block by block, for the horizontal block row, (a-2) detecting a head address of the block included in the first vertical block row on the basis of decoding data of a predetermined block included in the horizontal block row, (a-3) performing inversive quantization on the decoding data of the predetermined block, and (a-4) detecting a DC value from inversive quantized data of the predetermined block.

3. A method for expanding data according to claim 2, wherein the predetermined block is a last block of the horizontal block row, and the block included in the first vertical block row is a head block of a horizontal block row adjacent to the horizontal block row.

4. A method for expanding data according to claim 2, wherein the expanding process includes the decoding, the inversive quantization and IDCT conversion, wherein the step (b) includes steps of (b-1) performing decoding on a 1-block data beginning at the head address, (b-2) performing inversive quantization on the decoding data created by the step (b-1), and (b-3) performing IDCT conversion on the reversively quantized data created by the step (b-2) with using the DC value.

5. A data expanding method according to claim 4, wherein the step (b) further includes steps of (b-4) detecting the head address of a block included in the second vertical block row on the basis of the decoding data created by the step (b-1), and (b-5) detecting the DC value from the inversively quantized data created by the step (b-2).

6. A method for expanding data according to claim 1, further comprising the steps of:

(c) updating the first parameter by the second parameter;

(d) updating the first vertical block row by the second vertical block row; and (e) returning to the step (b).

* * * * *